United States Patent [19]

Yamashita et al.

[11] 4,158,404
[45] Jun. 19, 1979

[54] ELECTRIC SWITCH APPARATUS FOR AN AUTOMATIC CLUTCH IN AN AUTOMOTIVE POWER TRAIN USING A MANUAL POWER TRANSMISSION SYSTEM

[75] Inventors: Sinobu Yamashita; Kotei Takahashi, both of Tokyo, Japan

[73] Assignee: Nissan Motor Company, Limited, Japan

[21] Appl. No.: 831,408

[22] Filed: Sep. 8, 1977

[30] Foreign Application Priority Data

Sep. 10, 1976 [JP] Japan .................. 51-107697

[51] Int. Cl.² .................. F16D 67/00; B60K 21/00
[52] U.S. Cl. .................. 192/3.58
[58] Field of Search .................. 192/3.56, 3.57, 3.58

[56] References Cited

U.S. PATENT DOCUMENTS

| 3,322,247 | 5/1967 | Luzaich | 192/3.58 |
| 3,631,946 | 1/1972 | Grosseau | 192/3.58 |
| 3,910,388 | 10/1975 | Moori et al. | 192/3.58 X |

FOREIGN PATENT DOCUMENTS 1161188  3/1958  France .................. 192/3.58

*Primary Examiner*—Allan D. Herrmann
*Attorney, Agent, or Firm*—Robert E. Burns; Emmanuel J. Lobato; Bruce L. Adams

[57] ABSTRACT

In an automotive power train including a manually shifted power transmission system and an automatically operated clutch unit, the clutch unit is operated by electric actuating means which is controlled by means of an electric switch apparatus which includes first and second switch means responsive to a manipulative force applied to the manually operated transmission gearshift lever, and third to fifth switch means responsive to the movement of the transmission gearshift lever toward the various gear positions of the lever and arranged to be selectively open and closed in accordance with predetermined schedules.

5 Claims, 10 Drawing Figures

ELECTRIC SWITCH APPARATUS FOR AN AUTOMATIC CLUTCH IN AN AUTOMOTIVE POWER TRAIN USING A MANUAL POWER TRANSMISSION SYSTEM

The present invention relates to an automotive power train of the type having a manually shifted power transmission system and an automatically operated clutch unit intervening between the transmission system and the output shaft of the engine to drive the power train. The clutch unit of the power train to which the present invention appertains is of the type which is operated by electrically operated clutch actuating means which is adapted to operate the clutch unit depending upon the gear positions selected in the gear mechanism of the power transmission system, Thus, the present invention is more specifically concerned with an electric switch apparatus for use with such clutch actuating means.

In a manually shifted power transmission system of an ordinary automotive power train which has a manually operated clutch between the output shaft of the engine and the gear mechanism of the transmission system, gear shifts are effected by manipulating a manually operated gearshift lever mounted on the steering column or the floor board of the vehicle. Before the gearshift lever is to be moved to make a gear shift in a power transmission system of this type, the driver of the vehicle must take an action to uncouple the clutch which has been transmitting the driving power from the engine output shaft to the gear mechanism of the transmission system. The gearshift lever is thus manipulated by the vehicle driver with the clutch held in an uncoupled condition interrupting the transmittion of the driving power from the engine output shaft to the power transmission gear mechanism. After the gear shift is completed, the vehicle driver couples the clutch for a second time so that the driving power being delivered from the engine output shaft is allowed to reach the transmission gear mechanism.

In contrast to an automotive power train of this type, there is known an automotive power train using an automatically operated clutch unit which is adapted to be uncoupled in an automatic fashion when the gearshift lever is being manipulated by the vehicle driver so that the transmission of the driving power from the engine output shaft to the transmission gear mechanism is interrupted while shifts between gear positions are being made in the transmission system. The gearshift lever for use in the power transmission system of an automotive power train of this character is operated with or without the aid of hydraulic or pneumatic pressure, while the clutch unit is operated with the assistance of a suitable driving force which is usually produced by a hydraulic pressure.

In an automotive power train thus using a manually shifted power transmission system and an automatically operated clutch unit, means must be provided to transmit the movement of the transmission gearshift lever to the clutch unit for allowing the clutch unit to stay in the coupled condition in the absence of a manipulative effort applied to the gearshift lever and causing the clutch unit to uncouple when the gearshift lever is being manipulated to effect a gear shift in the transmission gear mechanism. A typical example of such means comprises a hydraulic or pneumatic control system including a relay-operated or solenoid-operated clutch control valve electrically connected to a switching device which is mounted on or in conjunction with the transmission gearshift lever. The hydraulic or pneumatic control system is arranged so that the switching device is closed and the clutch control valve is in a condition to maintain the clutch unit in the uncoupled condition when the transmission gearshift lever is being manipulated to make a gear shift in the transmission gear mechanism. When the gear shifting operation is complete and the transmission gearshift lever is released, the switching device is rendered open and accordingly the clutch control valve is brought into a condition allowing the clutch unit to stay in the coupled condition.

One drawback of a hydraulic or pneumatic clutch control system of this nature is that there is a certain amount of delay in allowing the clutch unit to couple after the switching unit is made open in response to release of the manipulative force from the transmission gearshift lever. This causes the engine to run idle until the clutch unit is allowed to fully couple after the transmission gearshift lever has been released from the manipulative force, with the result that a forceful mechanical shock is produced in the engine when the clutch unit is coupled. If, furthermore, it happens that the operator of the vehicle touches the transmission gearshift lever unintentionally while vehicle is being driven with the accelerator pedal depressed, the clutch unit is caused to uncouple unnecessarily and causes the engine to race. To avoid these drawbacks, the switching device of the control system is required to include, in addition to those switch elements which are responsive to the manipulative effort applied to the transmission gearshift lever, extra switch elements which are capable of responding to various minute motions of the transmission gearshift lever. Provision of such extra switch elements not only results in intricate construction of the control system as a whole and adds to the seriousity of the space requirement for the installation of the switching device on or in conjunction with the transmission gearshift lever but requires extremely time-taking, skilled techniques in assembling the switching device because the individual switch elements must be adjusted not only in relation to the motions of the transmission gearshift lever but with respect to each other so that each of the switch elements is enabled to properly perform the function which is allocated to the particular switch element.

It is, accordingly, the object of the present invention to provide, in an automotive power train of the type including a manually shifted power transmission system and an automatically operated clutch unit controlled by electrically operated clutch control means, an improved switch apparatus which has a simple and small-sized construction and which is easy and economical to manufacture and to install in an automotive vehicle in conjunction with the manually operated transmission gearshift lever.

In accordance with the present invention, there is provided, in an automotive power train having a power transmission system including a gear mechanism having a plurality of gear positions, a manually operated gearshift lever which is movable in opposite fore-and-aft directions and opposite lateral directions, and a control member operatively connecting the gearshift lever to the gear mechanism, the control member being axially movable in response to the movement of the gearshift lever in each of the aforesaid lateral directions thereof and rotatable about its axis in response to the movement of the gearshift lever in each of the aforesaid fore-andaft directions thereof for thereby producing any one of the gear positions in the gear mechanism, an automatically operated clutch unit intervening between said gear mechanism and a driving source, and electrically operated clutch control means for operating the clutch unit in response to a condition in which a shift is being made between the gear positions in the gear mechanism from the gearshift lever, the clutch control means being operative to allow the clutch unit to couple when de-energized and to cause the clutch unit to uncouple when energized, an electric switch apparatus electrically connected between a power source and the clutch control means and comprising a first switch assembly responsive to the movement of the gearshift lever in each of the lateral directions thereof and including a parallel combination of first switch means which is normally open and which is to close in response to the movement of the gearshift lever in one of the lateral directions thereof, and second switch means which is normally open and which is to close in response to the movement of the gearshift lever in the other lateral directions thereof, and a second switch assembly responsive to the rotation of the control member about the axis thereof and including a rotatable member rotatable with the control member about an axis substantially in line with the axis of rotation of the control member, a stationary member positioned adjacent the rotatable member, the control member being rotatable relative to the stationary member and axially movable relative to both the stationary member and the rotatable member, a set of contact elements extending in radial directions of the rotatable member and spaced apart from each other about the axis of rotation of the rotatable member, a set of contact elements extending arcuately about the axis of rotation of the rotatable member and spaced apart from each other in circumferential directions of the rotatable member, one of the two sets of contact elements being fixedly mounted on the rotatable member for constituting movable contacts and the other set of contact elements being fixedly mounted on the stationary member for constituting stationary contacts which are to be respectively contacted by the above mentioned movable contacts, each of the movable contacts and the associated one of the stationary contacts constituting in combination clutch control switch means which is to open and close depending upon the rotational position of the rotatable member relative to the stationary member, first and second switch assemblies being electrically connected in series with the clutch control means.

The above mentioned control member preferably has an end portion engageable with the aforesaid rotatable member and has formed in the end portion an elongated slot extending in parallel with the direction of the axial movement of the control member and having a laterally enlarged end portion which is open at the end of said end portion, wherein the aforesaid second switch assembly further includes a shaft supporting and rotatable with the rotatable member and having at one end of the shaft an axial projection protruding into the elongated slot in the control member for providing engagement between the control member and the shaft when the above mentioned projection is located out of the enlarged portion of the slot in the rotatable member.

The respective clutch control switch means constituted by the individual combinations of the movable and stationary contacts may comprise third switch means to close when the gearshift lever is within a predetermined positional range having one end at the limit of the movement of the gearshift lever in one of the lateral direction thereof and the other end immediately anterior to the limit of the movement of the gearshift lever in the other of the lateral directions thereof, and fourth switch means to close when the gearshift lever is within a predetermined positional range having one end immediately anterior to the limit of the movement of the gearshift lever in the aforesaid one of the lateral directions thereof and the other end at the limit of the movement of the gearshift lever in the aforesaid other of the lateral directions thereof the third and fourth switch means being electrically connected in parallel to the clutch control means across the first and second switch means, respectively. In this instance, the clutch control switch means may further comprise fifth switch means to close when the gearshift lever is within a predetermined positional range having opposite ends immediately anterior to the limits of the movement of the gearshift lever in the aforesaid lateral directions thereof, the fifth switch means being electrically connected to the clutch control means in parallel with the above mentioned third and fourth switch means.

The features and advantages of an electric switch apparatus according to the present invention will be more clearly appreciated from the following description taken in conjunction with the accompanying drawings in which.

Figure 3:
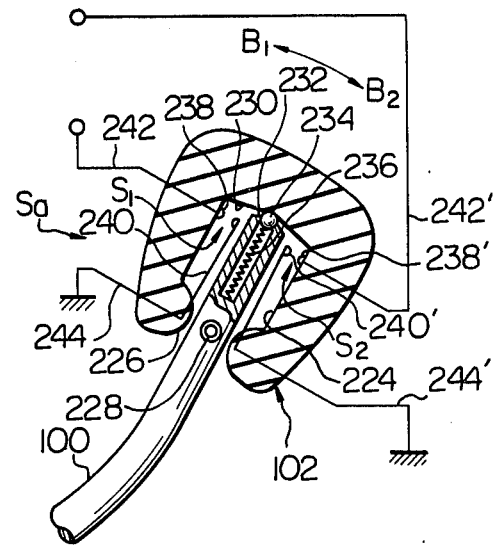
FIG. 3 is a cross sectional view showing the construction of a first switch assembly for the hydraulic clutch control system illustrated in FIG. 2.
Figure 5:
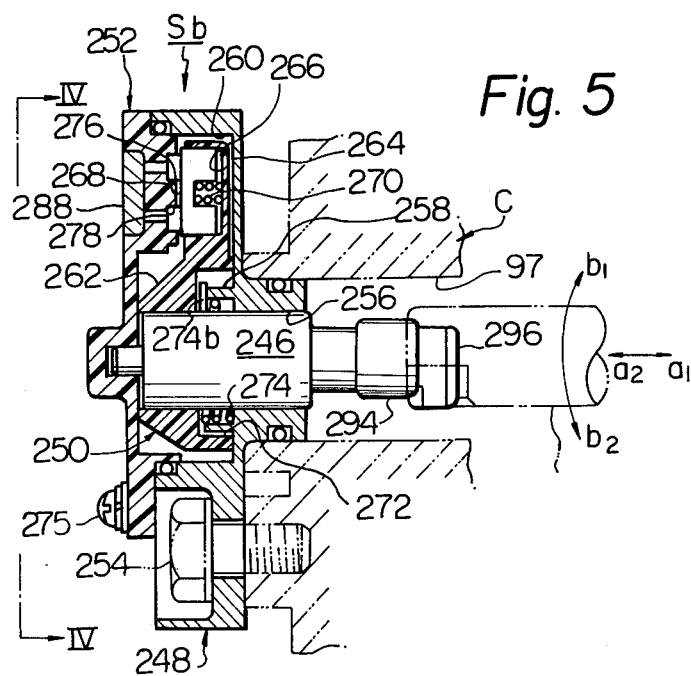
FIG. 5 is a cross sectional view taken along lines V—V of FIG. 4 in which the second switch assembly is viewed in the direction indicated by arrows IV.
Figure 4:
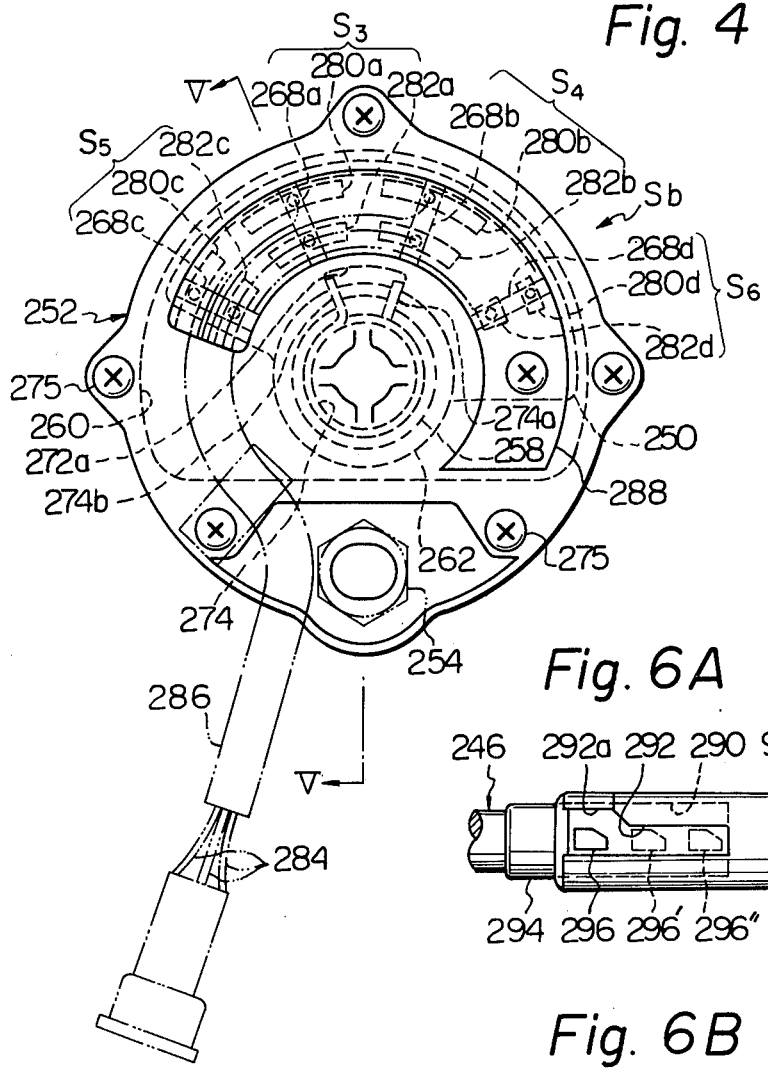
FIG. 4 is a front end view showing the construction of a second switch assembly for the hydraulic clutch control system of FIG. 2.
Figure 7:
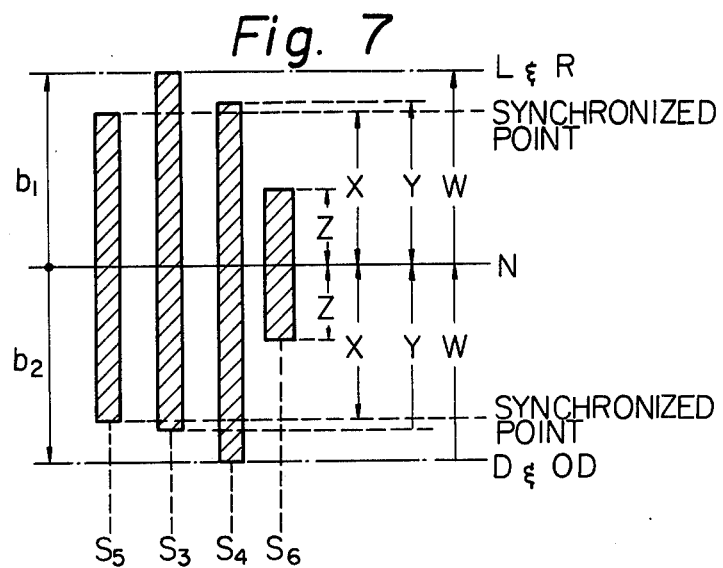
Figure 8:
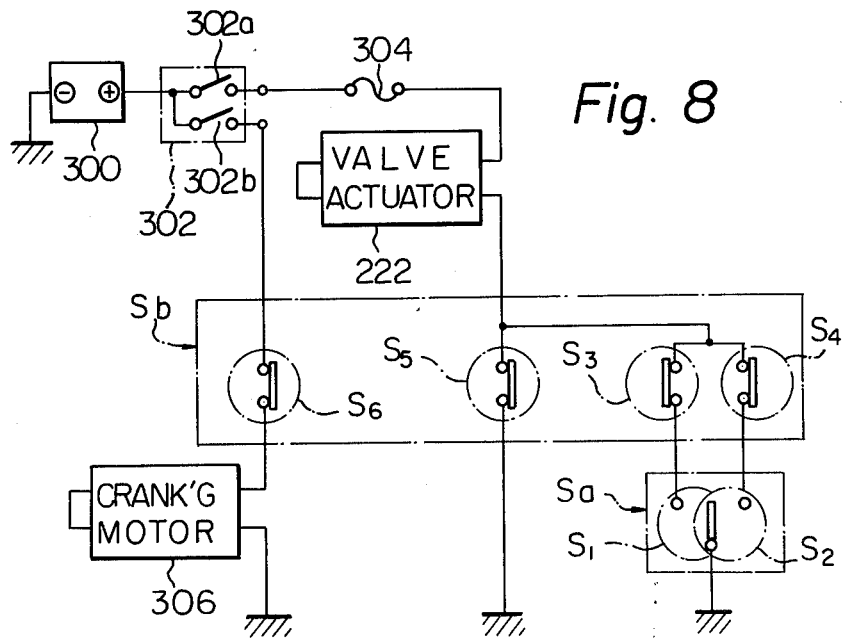

FIG. 7 is a diagram schematically showing schedules in accordance with which the individual clutch control switch means constituting the second switch assembly illustrated in FIGS. 4 and 5 are to be closed and open depending upon the position to which the transmission gearshift lever is moved from the neutral position thereof; and FIG. 8 is a schematic diagram showing an electric circuit including the first and second switch assemblies illustrated in FIGS. 3 to 5.

Figure 1:
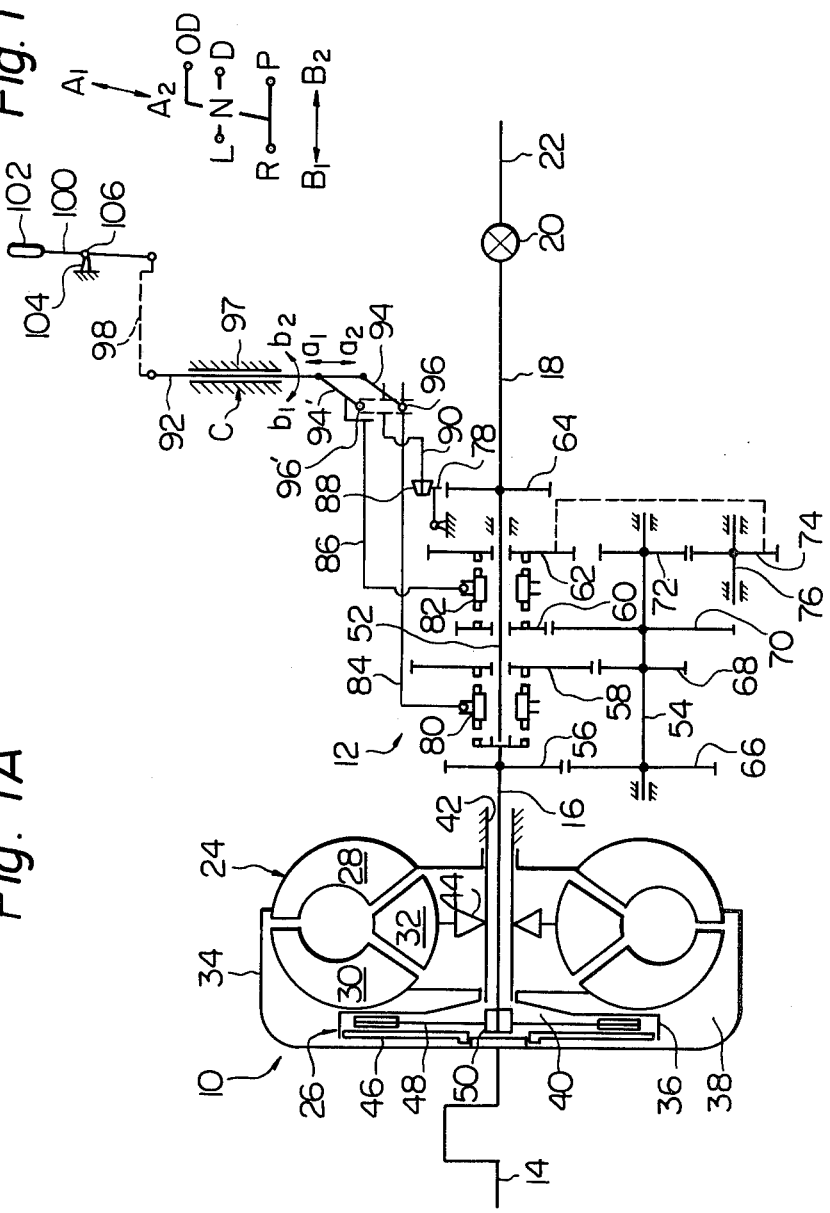
FIG. 1A is a schematic view showing a general construction of an automotive power train into which an electric switch apparatus embodying the present invention may be incorporated.
FIG. 1B is a diagram showing the positions to which the manually operated gearshift lever forming part of the power transmission system in the power train illustrated in FIG. 1A is movable to produce various gear positions in the gear mechanism of the transmission system.

Referring to the drawings, the automotive power train into which an electric switch assembly embodying the present invention is shown in FIG. 1A as comprising a torque converter and clutch assembly 10 and a gear mechanism 12 which forms part of a manually shifted power transmission system. The torque converter and clutch assembly 10 is provided intermediate between the crankshaft 14 of an automotive internal combustion engine (not shown) and a transmission input shaft 16 extending in alignment with the axis of rotation of the engine crankshaft 12. The transmission gear mechanism 12 has an output shaft 18 which is connected through a front universal joint 20 to a propeller shaft 22. As is well known, the propeller shaft 22 in turn is connected through a final drive unit and a differential to rear axles, thereby completing the power train of the vehicle, as is well known.

The torque converter and clutch assembly 10 consister of a torque converter 24 and a clutch unit 26. The torque converter 24 is shown, by way of example, to be of the three-member design consisting of a driving member or impeller 28, a driven member or turbine 30 and a stationary member or stator 32. The impeller 28 is connected to the engine crankshaft 14 by a torque converter torus cover 34 and is thus rotatable with the engine crankshaft 14 and the torus cover 34 about the axis of rotation of the crankshaft 14. The turbine 30 is positioned in front of the impeller 28 and is secured to a generally disc-shaped turbine support disc which is integral with or securely connected to a clutch housing 36. The clutch housing 36 is arranged to define first and second variable-volume chambers 38 and 40 within the torus cover 34. The first variable-volume chamber 38 is open in front of the clutch unit 26 and the second variable-volume chamber 40 is open at the rear of the clutch unit 24. The stator 32 is positioned between the impeller 28 and the turbine 30 and is supported by a stationary stator support hollow shaft 42 through a torque converter one-way clutch assembly 44. The transmission input shaft 16 extends through this stator support hollow shaft 42 in coaxial relationship to the hollow shaft 42.

On the other hand, the clutch unit 24 comprises a generally annular clutch piston 46 which is positioned between the converter torus cover 34 and the clutch housing 36. The clutch piston 46 is axially movable toward and away from the inner face of the front center portion of the torus cover and has its front face exposed to the above mentioned first variable-volume chamber 38 formed within the converter torus cover 34 by means of the clutch housing 36. Between the clutch housing 34 and the clutch piston 46 thus arranged is provided a clutch disc 48 which is securely mounted on a disc hub 50 splined to the transmission input shaft 16 and which is thus axially movable toward and away from the front face of the clutch housing 34. The previously mentioned second variable-volume chamber 40 is formed between the front face of the clutch housing 34 and the rear face of the clutch disc 48 which is thus arranged. When, thus, a fluid pressure is developed in the first variable-volume chamber 38 in the absence of a fluid pressure in the second variable-volume chamber 40, the clutch piston 46 is axially moved away from the rear face of the converter torus cover 34 by the force resulting from the fluid pressure acting on the front face of clutch piston 46. Under these conditions, the clutch piston 46 is in pressing engagement with the clutch disc 48 which is accordingly forced against the front face of the clutch housing 36 integral with or securely connected to the turbine 30 of the torque converter 24 so that the clutch unit 26 as a whole is rotatable with the turbine 30 and as a consequence the driving torque delivered from the engine crank shaft 14 is transmitted to the transmission input shaft 16 through the impeller 28 and turbine 30 of the torque converter 24, the clutch housing 36 and the clutch disc 48. When, conversely, a fluid pressure is developed in the second variable-volume chamber 40 in the absence of a fluid pressure in the first variable-volume chamber 38, the clutch piston 46 is forced against the rear face of the converter torus cover 34 by the force resulting from the fluid pressure acting on the rear face of the clutch piston 46. Under these conditions, the clutch piston 46 is disengaged from the clutch disc 48 which is accordingly separated from the turbine 30 of the torque converter 24 with the result that the driving connection between the engine crankshaft 14 and the transmission input shaft 16 is interrupted between the clutch housing 36 and the clutch disc 48.

The gear mechanism 12 of the power transmission system is of a countershaft synchromesh type and comprises a transmission mainshaft 52 in line with the transmission input and output shafts 16 and 18 and a transmission countershaft 54 which extends in parallel with the transmission mainshaft 52. The transmission mainshaft 52 is separate from the transmission input shaft 16 and is integral with the transmission output shaft 18. The transmission output shaft 54 is supported by the transmission casing (not shown) in such a manner as to be rotatable independently of the transmission mainshaft 52. The countershaft transmission gear mechanism 12 is assumed, by way of example, to be of the three-forward-speed and one-reverse-speed design and comprises a transmission main drive gear 56 secured to the transmission input shaft 16, mainshaft low, overdrive and reverse gears 58, 60 and 62 which are splined to the mainshaft 52, and a transmission parking-lock gear 64 which is secured to the mainshaft 52. On the other hand, the transmission countershaft 54 has securely mounted thereon a countershaft gear assembly which consists of a countershaft main gear 66 in constant mesh with the main drive gear 56, a countershaft low gear 68 in constant mesh with the mainshaft low gear 58, a countershaft overdrive gear 70 in constant mesh with the mainshaft overdrive gear 60, and a countershaft reverse gear 72 which is in constant mesh with a transmission reverse-idler gear 74 mounted on a transmission reverse-idler shaft 76 journalled to the transmission casing. The transmission reverse-idler gear 74 in turn is in constant mesh with the mainshaft reverse gear 62 as indicated by a broken line in FIG. 1A. The transmission parking-lock gear 62 is engageable with a pawl 78 which is adapted to be brought into locking engagement with parking-lock gear 62 when moved.

The countershaft transmission gear mechanism 12 further comprises first and second synchronizers 80 and 82 which are splined to the transmission mainshaft 52. The first synchronizer 80 is positioned between the main drive gear 56 and the mainshaft low gear 58 and is thus adapted to be coupled with the main drive gear 56 or the mainshaft low gear 58 for producing a direct-drive gear or low-speed gear condition in the transmission gear mechanism 12. The second synchronizer 82 is positioned between the mainshaft overdrive and reverse gears 60 and 62 and is thus adapted to be coupled with the mainshaft overdrive gear 60 or the mainshaft reverse gear 62 for producing an overdrive gear or reverse-drive gear condition in the transmission gear mechanism 12.

The first synchronizer 80 is engaged by a low and direc-drive shift rod 84 and, likewise, the second synchronizer 82 is engaged by an overdrive and reverse shift rod 84. Furthermore, the pawl 78 associated with the transmission parking-lock gear 64 is engaged by a cam 88 which is connected to a cam actuating rod 90. The shift rods 82 and 84 and the cam actuating rod 90 are operatively in engagement with a common striking rod 92 having arms 94 and 94' which are engageable as at 96 and 96' with the shift rods 84 and 86, respectively. The striking rod 92 is arranged to be axially movable in opposite directions as indicated by arrowheads $a_1$ and $a_2$ and rotatable about its center axis in opposite directions as indicated by arrowheads $b_1$ and $b_2$. The striking rod 92 thus arranged axially extends through a bore 97 formed in the transmission casing C and is connected by a suitable link 98 to a manually operated transmission gearshift lever 100 having a knob 102 and pivotally support by a bracket 104 as at 106. The bracket 104 may be mounted on or form part of the steering column or the floor board of the vehicle.

The manually operated gearshift lever 100 is assumed, by way of example, to be movable from a neutral gear position "N" to five different gear positions which consist of a low gear position "L", a direct-drive gear position "D", an overdrive gear position "OD", a reverse-drive gear position "R" and a parking gear position "P", as diagrammatically illustrated in FIG. 1B. More specifically, the gearshift lever 100 is rotatable about the pivotal point 106 in opposite lateral directions $A_1$ and $A_2$ for selecting the low and direct-drive gear positions "L" and "D", the overdrive gear position "OD" or the reverse-drive and parking gear positions "R" and "P" and in opposite fore-and aft directions $B_1$ and $B_2$ for making a shift from the neutral gear position "N" to the low or direct-drive gear position "L" or "D", the overdrive gear position "OD" or the reverse-drive or parking gear position "R" or "P". When the gearshift lever 100 is held in the neutral gear position "N", none of the gears 56, 58, 60 and 62 so that the transmission mainshaft 52 is disconnected, in effect, from the transmission input shaft 16. Under this condition, the cam 88 provided in association with the transmission parking-lock gear 64 is maintained in a position having the pawl 78 disengaged from the parking-lock gear 64. Movement of the gearshift lever 100 in the lateral or gear-selecting direction $A_1$ or $A_2$ is converted by means of the mechanical linkage 98 into movement of the striking rod 92 in the axial direction $a_1$ or $a_2$ and selects one of the shift rods 84 and 86 to be moved by the strking rod 92. On the other hand, movement of the gearshift lever 100 in the fore-and-aft or gear-shifting direction $B_1$ or $B_2$ brings about rotation of the striking rod 92 in the direction $b_1$ or $b_2$, respectively, about the axis of the rod 92. The rotational motion of the striking rod 92 is transmitted through the shift rod 84 or 86 to the first or second synchronizers 80 or 82, respectively, and causes the first synchronizer 80 to engage either the transmission main drive gear 56 or the mainshaft low gear 58 or the second synchronizer 82 to engage either the mainshaft overdrive gear 60 or the mainshaft reverse gear 62. In the arrangement shown in FIG. 1A, it is assumed that the first and second synchronizers 80 and 82 are brought into engagement with the mainshaft low and reverse gears 58 and 62, respectively, when the striking rod 92 is driven to turn in the direction $b_1$ with the gearshift lever 100 moved in the gear-shifting direction $B_1$ and into engagement with the transmission main drive gear 56 and the mainshaft overdrive gear 60, respectively, when the striking rod 92 is driven to turn in the direction $b_2$ with the gearshift lever 100 moved in the gear-shifting direction $B_2$. When the gearshift lever 100 is moved to the parking position "P", the cam 88 connected to the cam actuating rod 90 is forced to move the associated pawl 78 into locking engagement with the transmission parking-lock gear 64.

When the vehicle equipped with the power train thus constructed and arranged is in operation, a fluid pressure is developed in the first variable-volume chamber 38 within the torque converter torus cover 34 so that, if there is no fluid pressure developed in the second variable-volume chamber 40 within the clutch housing 36, the clutch unit 26 as a whole is held in the coupled condition establishing a driving connection from the engine crankshaft 14 to the transmission input shaft 16 through the torque converter 24, as previously described. The transmission main drive gear 56 on the input shaft 16 andand accordingly the gear assembly on the transmission countershaft 54 having the countershaft main gear 66 in constant mesh with the main drive gear 56 are thus kept driven with the shafts 16 and 66, respectively. If, under these conditions, the manually operated gearshift lever 100 is in the neutral position "N", none of the gears on the transmission mainshaft 52 is engaged by the first and second synchronizers 80 and 82 as previously noted so that the mainshaft low and overdrive gears 58 and 60 in mesh with the countershaft low and overdrive gears 68 and 70 and the mainshaft reverse gear 62 in mesh with the reverse-idler gear 74 meshing with the countershaft reverse gear 72 are left to idle on the transmission input shaft 52. The transmission mainshaft 52 is thus held at rest and, as a consequence, no driving torque is transmitted to the propeller shaft 22 from the transmission input shaft 16 which is being driven from the engine crankshaft 14. If the gearshift lever 100 is then moved manually into the low gear position "L", the striking rod 92 is driven to turn in the direction $a_1$ about the axis thereof and causes the low and direct-drive shift rod 84 to move the first synchronizer 80 to move rearwardly on the transmission input shaft 52 for engagement with the mainshaft low gear 58. When the first synchronizer 80 is thus brought into mating engagement with the mainshaft low gear 58, the gear 58 becomes rotatable with the transmission mainshaft 52 so that a driving torque is transmitted from the transmission input shaft 16 to the transmission mainshaft 52 through the main drive gear 56, the countershaft main gear 66, the countershaft 54, the countershaft low gear 68, the mainshaft low gear 58 and the first synchronizer 80, thereby producing a low gear condition in the transmission gear mechanism 12.

If the manually operated gearshift lever 100 is thereafter moved from the low gear position "L" to the direct-drive gear position "D", the striking rod 92 is driven to turn in the direction $b_2$ about its axis and causes the first synchronizer 80 to move forwardly on the transmission mainshaft 52. The first synchronizer 80 is thus disengaged from the mainshaft low gear 58 and is brought into mating engagement with the main drive gear 56 on the transmission input shaft 16. The transmission input shaft 16 is now coupled with the transmission mainshaft 52 through the main drive gear 56 and the first synchronizer 80, thereby completing a direct-drive connection between the transmission input shaft 16 and the transmission mainshaft 52.

When the maunally operated gearshift lever 100 is further mainpulated and is moved from the direct-drive gear position "D" to the overdrive gear position across the meutral gear position "N", the striking rod 92 is once rotated in the direction $b_1$ about the axis thereof and moves the first synchronizer 80 out of engagement with the main drive gear 56. The striking rod 92 is then moved in the axial direction $a_1$ selecting the overdrive and reverse shift rod 86 and is thereafter rotated in the direction $b_2$ about the axis thereof so as to cause the shift rod 86 to move the second synchronizer 82 forwardly on the transmission mainshaft 52. The second synchronizer 82 is thus brought into mating engagement with the mainshaft overdrive gear 60 so that a driving torque is transmitted from the transmission input shaft 16 to the transmission mainshaft 52 through the main drive gear 56, the countershaft main gear 66, the countershaft 54, the countershaft overdrive gear 70, the mainshaft overdrive gear 60 and the second synchronizer 82, producing an overdrive gear condition in the transmission gear mechanism 12.

On the other hand, if the manually operated gearshift lever 100 is moved from the neutral gear position "N" to the reverse-drive gear position "R", the striking rod 92 is rotated in the direction $b_1$ about the axis thereof and causes the second synchronizer 82 to move rearwardly on the transmission mainshaft 52 fro mating engagement with the mainshaft reverse-drive gear 62. When the mainshaft reverse-drive gear 62 is thus engaged by the second synchronizer 82, a driving torque is transmitted from the transmission input shaft 16 to the transmission mainshaft 52 through the main drive gear 56, the countershaft main gear 66, the countershaft 54, the countershaft reverse-drive gear 72, the reverse-idler gear 74, the mainshaft reverse-drive gear 62 and the second synchronizer 82, thereby producing in the transmission gear mechanism a reverse-drive gear condition causing the transmission mainshaft 54 to rotate in the direction opposite to the direction of rotation of the transmission input shaft 16.

If the manually operated gearshift lever 100 is moved from the neutral gear position "N" to the parking gear position "P", then the cam actuating rod 90 is moved in a direction to press the associated cam 88 against the pawl 78, which is accordingly brought into locking engagement with the transmission parking-lock gear 64 fixed on the transmission mainshaft 52. Since, under these conditions, the first and second synchronizers 80 and 82 are in engagement with none of the gears 56, 58, 60 and 62, the transmission mainshaft 52 is locked by the pawl 78 so that the power train posterior to the transmission mainshaft 52 is held in a locked condition.

Figure 2:
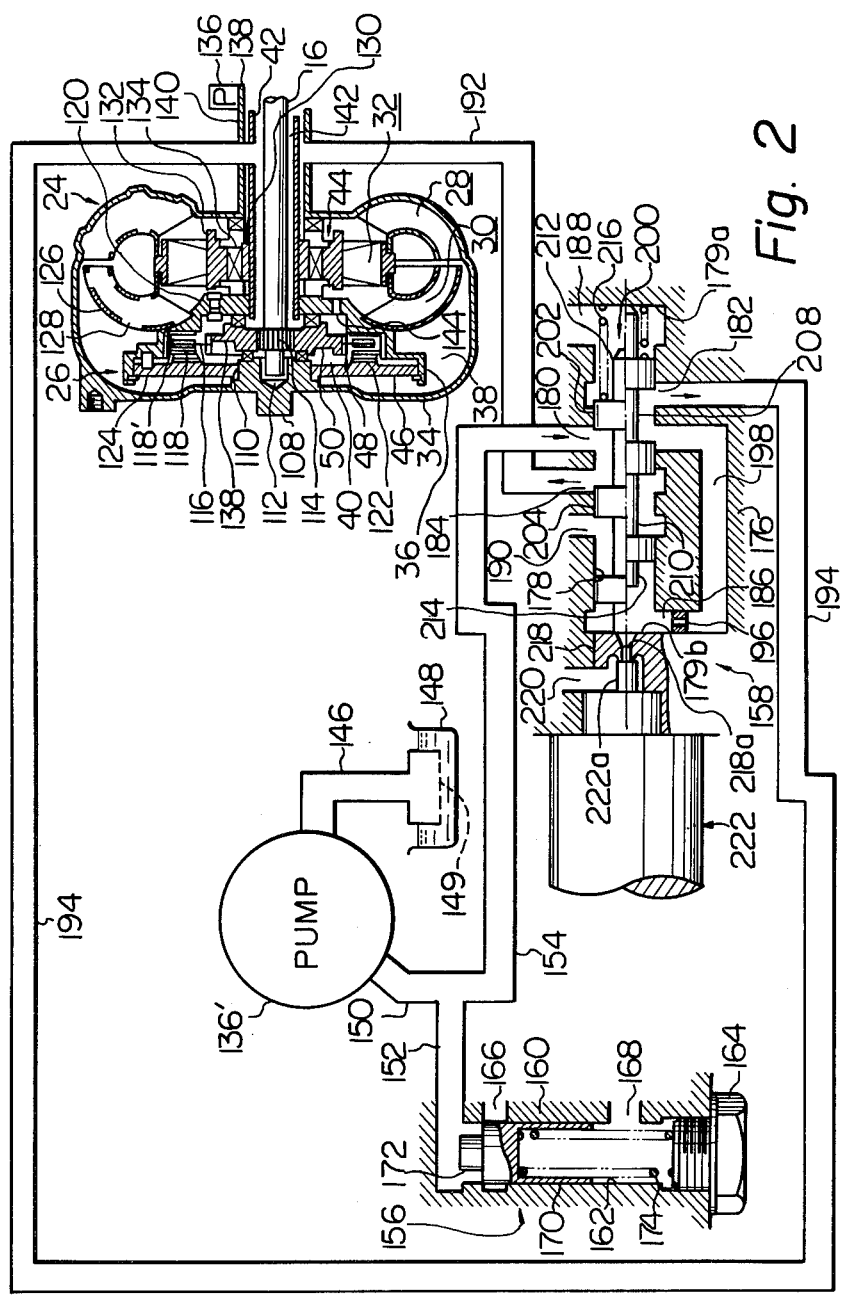
FIG. 2 is a partially sectional schematic view showing a torque converter and clutch assembly and an electrically operated clutch control system for the clutch unit in the torque converter and clutch assembly as provided in the automotive power train illustrated in FIG. 1A.

Each time the manually operated gearshift lever 100 is moved to make a shift between the various gear positions as above discussed, the fluid in the first variable-volume chamber 38 within the torque converter torus cover 34 is discharged from the chamber 38 and at the same time a fluid under pressure is directed into the second variable-volume chamber 40 within the clutch housing 36. The fluid pressure thus acting on the rear face of the clutch piston 46 forces the clutch disc 48 to move toward the rear face of the converter torus cover 34 in the absence of a fluid pressure acting on the front face of the clutch piston 46 and allows the clutch disc 48 to be disengated from the clutch housing 36, interrupting the driving connection from the torque converter 24 to the transmission input shaft 16. The fluid pressure developed in the second variable-volume chamber 40 is maintained and accordingly the clutch unit 26 is kept uncoupled throughout the period of time for which the gearshift lever 100 is being manipulated to make a shift in the transmission gear mechanism. When the shifting is complete and the gearshift lever 100 is released from the manipulative effort, the pressurized fluid in the second variable-volume chamber 40 is discharged therefrom and a fluid under pressure is introduced into the first variable-volume chamber 38 within the torque converter torus cover 34, thereby causing the clutch unit 26 to couple for a second time. The clutch unit 24 is in this fashion uncoupled and coupled each time the manually operated gearshift lever 100 is manipulated to make a shift between the various gear positions in the transmission gear mechanism 12. FIG. 2 shows a preferred example of an electrically operated hydraulic control system which is adapted to control the supply and discharge of the fluid pressures to and from the first and second variable-volume chambers 38 and 40 in the torque converter and clutch assembly 10 when the manually operated gearshift lever 100 is thus manipulated to make a shift in the transmission gear mechanism 12.

In FIG. 2, the torque converter and clutch assembly 10 which has been illustrated only schematically in FIG. 1A is depicted in more detail. Thus, the torque converter torus cover 34 is shown having a front boss portion 108 projecting forwardly from the torus cover 34 and a rear hub portion 110 projecting rearwardly from the torus cover 34 and formed with a counterbore 112 which is open at the rear end of the hub portion 110 and which has a center axis in line with the axis of rotation of the transmission input shaft 16. The transmission input shaft 16 has a front end portion journalled in the counterbore 112 in the rear hub portion 110 of the torus cover 34 by means of a bushing which is received in the counterbore 112. Though not shown, the front hub portion 108 of the converter torus cover 34 is received in a pilot bearing by means of which the flywheel of the engine connects the engine crankshaft 14 (FIG. 1A) to the converter torus cover 34. The transmission input shaft 16 further has an axially serrated portion 114 adjacent the above mentioned front end portion of the shaft 16.

The previously mentioned disc hub 50 of the clutch disc 48 forming part of the clutch unit 26 is formed with internal serrations and is splined to the externally serrated portion 114 of the transmission input shaft 16. An annular disc web 116 is splined along its inner circumferential edge to the outer circumferential end portion of the clutch disc hub 50. On both sides of the clutch disc web 116 are positioned front and rear clutch plates 118 and 118' which are splined along their respective outer edge portions to an intermediate flange portion of the clutch housing 36. The front clutch plate 118 is positioned between the clutch piston 46 and the clutch disc web 50 while the rear clutch plate 118' is positioned between the clutch disc web 116 and the previously mentioned turbine support disc which forms part of the clutch housing 36 and which is designated by reference numeral 120 in FIG. 2. Between the clutch piston 46 and the front clutch plate 118 is provided a spring assembly 122 which is operative to control the frictional forces to be produced between the clutch disc web 116 and the front and rear clutch plates 118 and 118' when a fluid pressure is built up in the first variable-volume chamber 38 within the converter torus cover 34 and forces the clutch piston 46 to press the front clutch plate 118 against the clutch disc web 116 and accordingly press the clutch disc web 116 against the rear clutch plate 118'. Designated by numeral 124 is one of guide pins which are secured to the clutch housing 36 and which extend in parallel with the axis of rotation of the clutch housing 36. These guide pins 124 are axially slidably received in holes formed in the clutch piston so that the angular position of the clutch piston 46 about the center axis thereof is maintained unchanged when the clutch piston 46 is axially moved relative to the clutch housing 36. The clutch piston 46 has an inner flange portion received on the outer peripheral surface of the rear hub portion 50 of the converter torus cover 34, as shown.

The turbine 30 of the torque converter 24 is shown comprising a torus member 126 which is formed with a plurality of openings 128 providing communication between the interior of the turbine 30 and the first variable-volume chamber 38 within the converter torus cover 34. The torus member 128 thus forming part of the turbine 30 of the torque converter 24 is secured to the turbine support disc 120 so that the clutch housing 36 and the clutch plates 118 and 118' on the clutch housing 36 are rotatable with the turbine 30 about the axis of rotation of the turbine 30. The turbine support disc 120 is slidably supported on the outer peripheral surface of a front end portion of the previously mentioned stator support hollow shaft 42.

The torque converter one-way clutch assembly 44 supporting the stator 32 of the torque converter 24 on the stator support hollow shaft 42 comprises a hub 130 which is splined to the hollow shaft 42, and a generally ring-shaped cam 132 which is coaxially and slidably received on the outer peripheral surface of the hub 130. The cam 132 is formed with a plurality of grooves which are arranged in symmetry about the center axis of the hub 130 and which are open to the outer peripheral surface of the hub 130. Spring loaded rollers 134 are received in these grooves and are in rollable contact with the outer peripheral surface of the hub 130 for thereby permitting the cam 132 to revolve on the hub 130 in one direction about the axis of rotation of the transmission input shaft 16. The cam 132 is secured to the stator 32 of the torque converter 24 by suitable fastening members (not shown) so that the stator 32 is rotatable in the direction of rotation of the transmission input shaft 16 and is locked up to the hub 130 on the stator support hollow shaft 42 when urged to turn in the opposite direction about the axis of rotation of the transmission input shaft 16.

Behind the torque converter 24 is provided a transmission oil pump unit 136 which is mounted on a pump support sleeve 138 securely connected to the impeller 28 of the torque converter 24 and extending in coaxial relationship with the stator support hollow shaft 42. The pump support sleeve 138 has its inner peripheral surface which is radially spaced apart from the outer peripheral surface of an intermediate axial portion of the stator support hollow shaft 42 so that a cylindrical first fluid passageway 140 is formed between the outer peripheral surface of the intermediate axial portion of the stator support hollow shaft 42 and the inner peripheral surface of the pump support sleeve 138. The fluid passageway 140 is in constant communication with the interior of the turbine 30 of the torque converter 24 and through the openings 128 in the turbine torus member 126 with the first variable-volume chamber 38 within the converter torus cover 34. The stator support hollow shaft 42 in turn has its inner peripheral surface radially spaced apart from the outer peripheral surface of the transmission input shaft 16 and thus forms a cylindrical second fluid passageway 142 is formed between the outer peripheral surface of the transmission input shaft 16 and the inner peripheral surface of the stator support hollow shaft 42. Constant communication is provided between the second fluid passageway 142 and the second variable-volume chamber 40 in the clutch housing 36 in a suitable manner. The turbine support disc 120 securely connected to or integral with the clutch housing 36 is formed with a small aperture 144 providing communication between the second variable-volume chamber 40 and the internal space of the converter turbine 30 so that the fluid in the torque converter 24 is enabled to be discharged at a limited rate from the torque converter 24 into the second variable-volume chamber 40 through the aperture 144 and from the variable-volume chamber 40 into the second fluid passageway 142 when the clutch unit 26 is coupled, thereby restricting the rise of the temperature of the working fluid in the torque converter 24.

The transmission oil pump unit 136 comprises an engine-driven oil pump 136' which has a suction port communicating with a fluid inlet passageway 146 leading from a fluid reservoir 148 through a fluid strainer 149. The oil pump 136' further has a delivery port communicating with a fluid outlet passageway 150 leading to branch passageways 152 and 154 which terminate in a fluid-pressure regulator valve unit 156 and a clutch control valve unit 158, respectively. The fluid-pressure valve unit 156 comprises a valve body 160 formed with a generally cylindrical valve chamber 162 which is closed at one axial end by a plug member constituted by a bolt 164 screwed into the valve body 160 and which communicates at the other end with the branch passageway 152. The valve body 160 is further formed with first and second drain ports 166 and 168 leading from the valve chamber 162 and communicating with passageways which terminate in the fluid reservoir 148. The first drain port 166 is located in the vicinity of the axial end of the valve chamber 162 open to the branch passageway 152, while the second drain port 168 is constantly open to a longitudinally intermediate portion of the valve chamber 162. Within the valve chamber 162 is mounted a generally cylindrical valve member 170 which has formed at one axial end thereof an axial projection 172 protruding toward the axial end of the valve chamber 162 open to the branch passageway 152, the valve member 170 further having a cylindrical concavity which is open at the axial end of the valve member opposite to the above mentioned axial projection 172. The valve member 170 is axially slidable within the valve chamber 162 and, thus, opens up or closes the first drain port 166 depending upon the axial position of the valve member 170 within the valve chamber 162. The valve member 170 is urged to axially move in a direction to close the first drain port 166 by suitable biasing means such as a preloaded helical compression spring 174 which is seated at one end on the end face of the bolt 164 and at the other end on the bottom face of the concavity in the valve member 170. When the oil pump 136' is operative and delivers a fluid under pressure to the branch passageway 152, a fluid pressure acts on the valve member 170 and urges the valve member 170 to axially move in a direction to open up the first drain port 166 against the opposing force of the compression spring 174. When, thus, the fluid pressure acting on the valve member 170 is higher than a predetermined level which is dictated by the relationship between the cross sectional area of the valve member 170 and the force of the compression spring 174, the force resulting from the fluid pressure acting on the valve member 170 overcomes the force of the compression spring 174 and causes the valve member 170 to axially move to a position at least partially opening up the first drain port 166 for a allowing the fluid to be discharged at a limited rate from the valve chamber 162 into the drain port 166. When the fluid pressure acting on the valve member 170 is thus diminished and reaches the predetermined level, the force resulting from such a fluid pressure is equalized with the opposing force of the compression spring 174 so that the valve member 174 is held in an equilibrium axial position within the valve chamber 162. The fluid pressure delivered from the oil pump 136' into the fluid outlet passageway 150 and the branch passageways 152 and 154 is in this fashion maintained at a level not higher than the above mentioned predetermined level.

On the other hand, the clutch control valve unit 158 comprises a valve body 176 formed with an elongated valve chamber 178 extending between end faces 179a and 179b, the end face 179a being formed by an internal surface portion of the valve body 176. The valve body 176 is further formed with a fluid inlet port 180, first and second fluid outlet ports 182 and 184, a control port 186, and first and second drain ports 188 and 190. The fluid inlet port 180 is in constant communication with the branch passageway 154, while the first and second fluid outlet ports 182 and 184 are in constant communication with the previously described first and second fluid passageways 140 and 142 in the torque converter and clutch assembly 10 through passageways 192 and 194, respectively. The control port 186 communicates through a flow restriction or orifice 196 with a bypass passageway 198 leading from the fluid inlet port 180. The drain ports 188 and 190 are in communication with the fluid reservoir 148. The control port 186 and the second drain port 190 is located at the axial ends of the valve chamber 162, while the first drain port 188, first fluid outlet port 182, fluid inlet port 180 and second fluid outlet port 184 are arranged in this sequence away from the control port 186 toward the second drain port 190 as shown. Within the valve chamber 178 is mounted a valve spool 200 having first, second and third lands 202, 204 and 206 which are arranged in this sequence away from one end face 179a of the valve chamber 178 toward the other end face 179b and which have equal cross sectional areas. The lands 202, 204 and 206 are axially spaced apart from each other and form a first circumferential groove 208 between the first and second lands 202 and 204 and a second circumferential groove 210 between the second and third lands 204 and 206. The valve spool 200 further has first and second axial projections 212 and 214 protruding from the outer end faces of the first and third lands 202 and 206, respectively, toward the end faces 179a and 179b, respectively, of the valve chamber 178. The valve spool 200 thus configured is axially slidable within the valve chamber 178 between a first axial position providing communication between the fluid inlet port 180 and the first fluid outlet port 182 through the first circumferential groove 208 in the valve spool 200 and between the second fluid outlet port 184 and the second drain port 190 as indicated by the upper half of the valve spool 200 in FIG. 2 and a second axial position providing communication between the fluid inlet port 180 and the second fluid outlet port 184 through the first circumferential groove 208 in the valve spool 200 and between the first fluid outlet port 182 and the first drain port 188 through the second circumferential groove 210 in the valve spool 200 as indicated by the lower half of the valve spool 200. When the valve spool 200 is in the first axial position thereof, the second axial projection 214 of the valve spool has its end face in close contact with the end face 179b of the valve chamber 178. Likewise, when the valve spool 200 is in the second axial position thereof, the first axial projection of the valve spool has its end face in close contact with the end face 179a of the valve chamber 178. The valve spool 200 is urged to move toward the first axial position thereof by suitable biasing means such as a preloaded helical compression spring 216 which is seated at one end on the outer end face of the first land 202 of the valve spool 200 and at the other end on the end face 179a of the valve chamber 178.

The end face 179b defining one axial end of the valve chamber 178 is formed by a plug member 218 closely fitted to the valve body 176 so that the valve chamber 178 has a variable-volume end portion 178a between the end face 179b of the plug member 218 and the outer end face of the third land 206 of the valve spool 200. The plug member 218 is formed with a nozzle 218a which is open at one end to the variable-volume end portion 178a of the valve chamber 178 and at the other end to a fluid discharge port 220. The nozzle 218a has a cross sectional area which is sufficiently larger than the cross sectional area of the orifice 196 between the control port 186 and the bypass passageway 198. A solenoid operated valve actuator 222 has a plunger 223 axially projecting toward the outer end of the nozzle 218a. Though not shown in the drawings, the solenoid operated valve actuator 222 is constructed and arranged in such a manner that the plunger 223 thereof is moved forwardly and closes the outer end of the nozzle 218a at the leading end of the plunger 223 when the valve actuator 222 is energized. The plunger 223 is biased to move away from the outer end of the nozzle 218a so that the nozzle 218a is open when the solenoid operated valve actuator 222 is de-energized.

When, thus, the solenoid operated valve actuator 222 remains de-energized, the nozzle 218a in the plug member 218 is kept open and provides communication between the variable-volume end portion 178a of the valve chamber 178 and the fluid discharge port 220 through the nozzle 218a. The nozzle 218a being sufficiently larger in cross sectional area than the orifice 196, the fluid entering the end portion 178a of the valve chamber 178 through the orifice is discharged to the fluid discharge port 220 through the nozzle 218a so that there is no fluid pressure developed in the end portion 178a of the valve chamber 178. The valve spool 200 is therefore held in the previously described first axial position thereof by the force of the compression spring 216 and establishes communication between the fluid inlet port 180 and the first fluid outlet port 182 through the first circumferential groove 208 in the valve spool 200 and between the second fluid outlet port 184 and the second drain port 190 as indicated by the upper half of the valve spool 200 in FIG. 2. Under these conditions, the fluid delivered from the oil pump 136' to the fluid inlet port 180 through the branch passageway 154 is passed through the first fluid outlet port 182 of the valve unit 158 to the passageway 192 and from the passageway 192 to the first variable-volume chamber 38 within the torque converter torus cover 34 through the first fluid passageway 138 formed between the stator support hollow shaft 42 and the pump support sleeve 138 of the torque converter and clutch assembly 10. The clutch unit 26 is thus held in the coupled condition by the fluid pressure which acts on the front face of the clutch piston 46 as previously described in detail. When, conversely, the solenoid operated valve actuator 222 is energized and accordingly the plunger 223 thereof is in an axial position closing the outer end of the nozzle 218a in the plug member 218 so that a fluid pressure is developed in the end portion 178a of the valve chamber 178 by the fluid entering the end portion 178a through the bypass passageway 198 and the orifice 196. The fluid pressure thus acting on the valve spool 200 from the end portion 178a of the valve chamber 178 causes the valve spool 200 to axially move away from the end face 179b of the plug member 218 against the opposing force of the compression spring 216 and finally assumes the previously mentioned second axial position providing communication between the fluid inlet port 180 and the second fluid outlet port 184 and between the first fluid outlet port 182 and the first drain port 188. The fluid which has been delivered into the first variable-volume chamber 38 within the torque converter torus cover 34 through the first fluid passageway 140 between the turbine support hollow shaft 42 and the pump support sleeve 138 is now discharged into the fluid reservoir 148 through the passageway 192 and the first drain port 188 and instead a fluid pressure is developed in the second variable-volume chamber 40 within the clutch housing 36 through the second fluid passageway 142 between the transmission input shaft 16 and the stator support hollow shaft 42. The clutch unit 26 is therefore caused to uncouple by the fluid pressure thus acting on the rear face of the clutch piston 46. The clutch unit 26 is in these manners uncoupled and coupled when the solenoid operated valve actuator 222 is energized and de-energized, respectively.

The present invention is directed at an electric switch apparatus adapted to be incorporated into an electric circuit arrangement to energize and de-energize the solenoid operated valve actuator 222 in response to the movement of the manually operated gearshift lever 100 (FIG. 1A) to be moved when a shift is to be made in the transmission gear mechanism.

In the embodiment of the present invention to be hereinafter described with reference to FIGS. 3 to 8 of the drawings, such a switch apparatus is shown comprising a first switch assembly Sa which is responsive to the movement of the gearshift lever 100 in the fore-and-aft directions $B_1$ and $B_2$ thereof, viz., the rotational motion of the striking rod 92 (FIG. 1A) in the directions $b_1$ and $b_2$ about the center axis thereof and a second switch assembly Sb which is responsive to the movement of the gearshift lever 100 in the lateral directions $A_1$ and $A_2$ thereof, viz., the movement of the striking rod 92 in the directions $a_1$ and $a_2$ thereof.

Referring to FIG. 3, the first switch assembly Sa is arranged in conjunction with the knob 102 on the manually operated gearshift lever 100. The knob 102 is formed of an electrically nonconductive material and has a concavity 224 which is open at the lower end of the knob 102 having an internal annular protrusion 226 defining at the lower end of the concavity 224 an opening through which the gearshift lever 100 axially projects into the concavity 224. The knob 102 further has a conical internal surface portion 230 defining the innermost closed end of the concavity 224 and having a vertex in close proximity the leading end of the gearshift lever 100. The gearshift lever 100 in turn has formed in its leading end portion an elongated bore 232 which is open at the extreme end of the gearshift lever 100, viz., in close proximity to the vertex of the conical internal surface portion 230 of the knob 102. A rigid ball 234 is received on the conical internal surface portion 230 of the knob 102 and is forced against the surface portion 230 by means of a preloaded helical compression spring 236 which is accommodated in the bore 232 in the gearshift lever 100 and which is seated at one end on the ball 234 whereby the knob 102 is urged to hold a position having the ball 234 situated at the vertex of the conical internal surface portion 230 of the knob 102 as shown, the particular position being herein referred to as the neutral position of the knob 102. The knob 102 has securely mounted on its internal side surface portion first and second electrical contact elements 238 and 238' which are spaced apart from each other across the leading end portion of the gearshift lever 100 in the fore-and-aft directions in which the gearshift lever 100 is to be moved. When the knob 102 is moved for rocking motions about the center axis of the pivotal pin 228, the contact elements 238 and 238' on the knob 102 are moved relative to the gearshift lever 100 and thus constitute movable contact elements. First and second stationary contact elements 240 and 240' extend from the internal annular protrusion 226 of the knob 102 into the concavity 224 and have their leading end portions located in proximity to the first and second movable contact elements 238 and 238', respectively 224 in the knob 102. These stationary contact elements 240 and 240' are slightly movable with respect to the gearshift lever 100 when the knob 102 is moved for rocking motions about the center axis of the pivotal pin 228. Such movements of the contact elements 240 and 240' are, however, negligible as compared with the amounts of displacement of the movable contact elements 238 and 238' and, for this reason, the contact elements 240 and 240' are herein denoted as the stationary contact elements for brevity of description. The first and second stationary contact elements 240 and 240' are located in conjunction with the movable contact elements 238 and 238' in such a manner that the first movable contact element is brought into contact with the first stationary contact element 240 when the knob 102 is moved to rock in one lateral direction $B_1$ and, likewise, the second movable contact element 238' is brought into contact with the second stationary contact element 240' when the knob 102 is moved to rock in the other lateral direction $B_2$ about the axis of the pin 238. When the knob 102 is held in the previously mentioned neutral position thereof, the movable contact elements 238 and 238' are separate from the stationary contact elements 240 and 240', respectively, as shown. The first movable and stationary contact elements 238 and 240 constitute, in combination, normally-open first switch means $S_1$ and, likewise, the second movable and stationary contact elements 238' and 240' constitute, in combination, normally-open second switch means $S_2$. The first switch assembly Sa illustrated in FIG. 3 is thus essentially composed of the normally-open first and second switch means $S_1$ and $S_2$ which are adapted to be closed when the knob 102 on the manually operated gearshift lever 100 is moved in the fore-and-aft directions $B_1$ and $B_2$, respectively. The movable contact elements 238 and 238' are connected to lead wires 242 and 242', respectively, for connection to a power source (not shown) while the stationary contact elements 240 and 240' are grounded by lead wires 244 and 244', respectively.

Turning to FIGS. 4 and 5 of the drawings, the second switch assembly Sb is arranged in conjunction with the striking rod 92 forming part of the mechanical linkage intervening between the manually operated gearshift lever 100 and the transmission gear mechanism 12 (FIG. 1A) and largely comprises a shaft 246 rotatable with the striking rod 92, a stationary shaft support member 248 supporting the shaft 246, a rotatable contact support member 250 keyed or splined to the shaft 246, and a stationary contact support member 252 which is secured to the shaft support member 248 with the rotatable contact support member 250 positioned between the stationary shaft and contact support members 248 and 252. As will be better seen from FIG. 5, the stationary shaft support member 248 is fixedly mounted on the transmission casing C by suitable fastening means such as a bolt 254 and is formed with an axial bore 256 through which the shaft 246 is mounted on the support member 248 in a manner to be rotatable relative to the support member 248 about its center axis which is substantially in line with the axis of rotation of the striking rod 92 extending through the bore 97 in the transmission casing C. The stationary shaft support member 248 has a generally cylindrical projection 258 radially outwardly spaced apart from the outer peripheral surface of an intermediate axial portion of the shaft 246 and forms an annular gap between the outer peripheral surface of the shaft 246 and the inner peripheral surface of the cylindrical projection 258. As will be seen from FIG. 4, the cylindrical projection 258 has an axial slot slightly elongated substantially in parallel with the axis of rotation of the shaft 246 and forming two edge portions which are slightly spaced apart from each other in the circumferential direction of the projection 258. The stationary shaft support member 248 is further formed with a generally semicircular recess 260 containing the cylindrical projection 258 therein.

The rotatable contact support member 250 is constructed of an electrically non-conductive material such as a rigid plastic and has a generally frusto-conical portion 262 keyed or splined to the shaft 246 and a generally sector-shaped portion 264 positioned within the generally semicircular recess 260 in the stationary shaft support member 248. The generally semicircular recess 260 in the shaft support member 248 is so shaped as to be capable of sufficiently accommodating therewithin the rotational movement of the sector-shaped portion 264 of the rotatable contact support member 250 which is to be moved for rotation about the center axis of the shaft 246 when the striking rod 92 is driven to turn between the limit rotational positions thereof about the center axis of the rod 92 in the directions of the arrowheads $b_1$ and $b_2$. The rotatable contact support member 250 has formed in its sector-shaped portion 264 four radial grooves extending in radial directions about the center axis of the shaft 246 and spaced apart from each other in a circumferential direction of the contact support member 250 as commonly indicated at 266 in FIG. 5. Four radial contact elements 268a, 268b, 268c and 268d are respectively received in these radial grooves 266 and are urged to protrude outwardly from the grooves in directions substantially parallel with the center axis of the shaft 246 by suitable biasing means such as a preloaded helical compression spring 270 which is seated at the bottom of each of the grooves 266 and which is partly received in a hole formed in each of the radial contact elements 268a, 268b, 268c and 268d, as shown in FIG. 5. When the rotatable contact support member 250 is driven for rotation about the center axis of the shaft 246, the radial contact elements 268a, 268b, 268c and 268d revolve around the center axis of the shaft 246 and will therefore be hereinafter referred to as movable contacts. The rotatable contact support member 250 is further formed with a recess 272 accommodating therewithin the previously described cylindrical projection 258 of the stationary shaft support member 248 and having a generally sector shaped portion 272a which has a center axis substantially coincident with the axis of rotation of the shaft 246 and which has two radial edges at the circumferential ends of the sector-shaped portion 272a as indicated by broken lines in FIG. 4. A helical torsion spring 274 having radially outwardly bent end portions 274a and 274b is positioned, in coaxial relationship with the shaft 246, in the cylindrical gap between the outer peripheral surface of the shaft 246 and the inner peripheral surface of the cylindrical projection 258 of the stationary shaft support member 248. The helical torsion spring 274 has its radially outwardly bent end portions 274a and 274b received on the opposite edges of the previously mentioned axial slot in the cylindrical projection 258 of the stationary shaft support member 248 and located within the sector-shaped portion 274a of the recess 272 in the rotatable contact support member 250. Thus, the torsion spring 274 is effective to urge the rotatable contact support member 250 to stay in a predetermined fiducial angular position about the center axis of the shaft 246 with respect to the stationary shaft and contact support members 248 and 252 so that, when the rotatable contact support member 250 is forced to rotate in either direction away from such a fiducial angular position about the center axis of the shaft 246, the contact support member 250 is urged to turn in a reverse direction toward the fiducial angular position by the force of the torsion spring 274. The rotatable contact support member 250 shown in FIG. 4 is assumed to be held in the above mentioned fiducial angular position thereof.

The stationary contact support member 252 is also constructed of an electrically non-conductive material such as a rigid plastic and is fixedly connected to the stationary shaft support member 248 by suitable fastening means such as bolts 275. The stationary contact support member 252 has formed in its wall portion facing the above described movable contact elements 268a to 268d in the rotatable contact support member 250 a first set of arcuate grooves 278 which are radially inwardly spaced apart from the first set of arcuate grooves 276 about the center axis of the shaft 246 as will be seen from FIG. 5. The first set of arcuate grooves 276 has closely fitted therein a first set of arcuate contact elements 280a, 280b, 280c and 280d which are arcuately curved about the center axis of the shaft 246 and which are spaced apart from each other in circumferential directions about the center axis of the shaft 246. Likewise, the second set of arcuate grooves 278 has closely fitted therein a second set of arcuate contact elements 282a, 282b, 282c and 282d which are arranged similarly to the first set of arcuate contact elements 280a to 280d and which are radially inwardly spaced apart from the contact elements 280a, 280b, 280c and 280d, respectively. The four pairs of contact elements 280a and 282a, 280b and 282b, 280c and 282c, and 280d and 282d thus mounted on the stationary contact support elements constitute four sets of stationary contacts and are located to be in conjunction with the previously mentioned four movable contacts 268a, 268b, 268c and 268d, respectively, on the rotatable contact support member 250. More specifically, the movable contacts 268a to 268d on the rotatable contact support member 250 and the movable contacts 280a and 282a to 280d to 282d on the stationary contact support member 252 are located in such a manner that, when the rotatable contact support member 250 is in the previously mentioned fiducial angular position about the center axis of the shaft 246 by the force of the torsion spring 274, the movable contacts 268a, 268b, 268c and 268d are located at predetermined fiducial points of their respectively associated stationary contacts 280a and 282a, 280b and 282b, 280c and 282c, and 280d and 282d, respectively, as shown in FIG. 4. The movable contacts 268a to 268d being urged to protrude outwardly from the grooves 266 in the rotatable contact support member 250 by means of the preloaded helical compression springs 270 as previously described, each of the movable contacts 268a, 268b, 268c and 268d is forced to be in contact with each of the combinations of the stationary contacts 280a and 282a, 280b and 282b, 280c and 282c, and 280d and 282d, respectively, when the rotational contact support member 250 is in an angular position having each of the movable contacts located within the coverage of the combination of the associated stationary contacts. In the second switch assembly Sb of the apparatus embodying the present invention, the combination of the movable contact 268a and stationary contacts 280a and 282a the combination of the movable contact 268b and stationary contacts 280b and 282b, the combination of the movable contact 268c and stationary contacts 280c and 282c, and the combination of the movable contact 268d and stationary contacts 280d and 282d constitute third, fourth, fifth and sixths switch means $S_3$, $S_4$, $S_5$ and $S_6$, respectively, of the switch apparatus. When the movable contact of each of these switch means $S_3$, $S_4$, $S_5$ and $S_6$ is in contact with the two stationary contacts of the switch means, there is provided electrical connection between the stationary contacts through the movable contact and thus the particular switch means assumes a closed condition. The individual contact elements on the stationary contact support member 252 are connected to lead wires 284 which are bundled in a protective sheath 286, as shown in 4. Designated by reference numeral 288 is a strip of sealing compound which is attached to the outer face of the stationary contact support member 252 for protecting the contact elements on the member 252 from electrolytic corrosion.

Figure 6A:
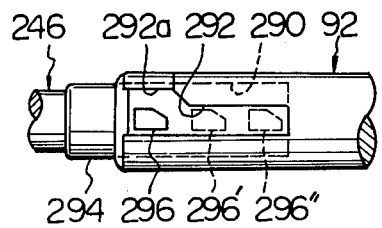
FIG. 6A is a fragmentary external view showing respective engaging end portions of a component element of the mechanical linkage between the gearshift lever and the gear mechanism of the power transmission system shown in FIG. 1 and of an operational element of the second switch assembly illustrated in FIGS. 4 and 5.
Figure 6B:
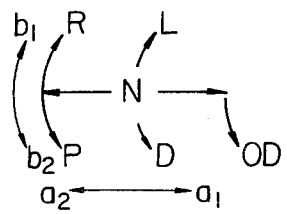
FIG. 6B is a diaphragm showing the directions in which the component element of the mechanical linkage as illustrated in FIG. 6A is movable when the transmission gearshift lever is moved to the positions demonstrated in FIG. 1B.

On the other hand, the striking rod 92 has an axial bore 290 which is open toward the shaft 246 passed through the bore 256 in the stationary contact support member 248 and an axially elongated slot 292 which is open at the extreme end of the striking rod 92 and which has a circumferentially enlarged end portion 292a as indicated by broken lines in FIG. 6A. The shaft 246 extending in line with the striking rod 92 thus configured has a cylindrical end portion 294 projecting into the axial bore 290 in the striking rod 92 and a generally wedge-shaped projection 296 axially protruding from the end portion 294 into the elongated slot 292 in the striking rod 92. While the shaft 246 per se is axially fixed relative to the transmission casing C, the striking rod 92 is axially movable relative to the transmission casing C and according to the shaft 246 with the cylindrical end portion 294 of the shaft 246 kept received in the bore 290 and with the wedge-shaped projection 296 of the shaft 246 kept located within the elongated slot 292. When, thus, the transmission gearshift lever 100 is manually moved in the directions $A_1$ and $A_2$ accordingly the striking rod 92 is axially moved in the directions of the arrowheads $a_1$ and $a_2$ as indicated in FIG. 6B, the wedge-shaped projection 296 of the shaft 246 assumes different axial positions relative to the striking rod 92 as indicated by 296, 296' and 296" in FIG. 6A. When, more particularly, the transmission gearshift lever 100 is in the position to select the low, direct-drive or overdrive gear position "L", "D" or "OD", the wedge-shaped projection 296 of the shaft 246 is located within the reduced portion of the elongated slot 292 in the striking rod 92 as indicated by 296' or 296" in FIG. 6A so that the shaft 246 is rotatable with the striking rod 92. When, on the other hand, the gearshift lever 100 is in the position to select the reverse-drive or parking gear position "R" or "P", then the wedge-shaped projection 296 of the shaft 246 is located within the enlarged end portion 292a of the slot 292 in the striking rod 92 as indicated by full lines in FIG. 6A so that the wedge-shaped projection 296 is not capable of engaging one of the circumferentially spaced apart axial edge portions forming the enlarged end portion 292a of the slot 292 in the striking rod 92. The end portion 292a of the elongated slot 292 in the striking rod 92 is circumferentially enlarged in a direction in which the striking rod 92 is to be turned in the sirection of the arrowhead $b_1$ about its axis with the transmission gearshift lever 100 moved in the direction of the arrowhead $B_1$. When, thus, the transmission gearshift lever 100 is moved to select the parking gear position "P", the wedge-shaped projection 296 is disengaged from the strking rod 92 with the result that the movement of the transmission gearshift lever 100 from the neutral gear position "N" to the parking gear position "P" is not transmitted to the shaft 246. When, however, the transmission gearshift lever 100 is moved to the reverse-drive gear position "R", the wedge-shaped projection 296 of the shaft 246 is held in engagement with the striking rod 92 and is thus rotatable with the striking rod 92. The elongated slot 292 in the strking rod 92 and the wedge-shaped projection 296 of the shaft 246 are arranged so that the rotatable contact support member 250 carried by the shaft 100 is in the previously mentioned fiducial angular position thereof when the transmission gearshift lever 100 is in the neutral gear position "N".

FIG. 7 shows in the form of a bar graph an example of the schedules in accordance with which the third, fourth, fifth and sixths switch means $S_3$, $S_4$, $S_5$ and $S_6$ thus constructed and arranged in the second switch assembly Sb are to be open and closed responsive to the movement of the transmission gearshift lever 100 from the neutral position "N" to any of the low, direct-drive, overdrive, and reverse-drive gear positions "L", "D", "OD" and "R". In FIG. 7, the lengths of the bars from the line N indicate the central angles of the four pairs of contact elements 280a and 282a, 280b and 282b, 280c and 282c and 280d and 282d on the rotatable contact support member 250 from the predetermined fiducial points of the individual contact elements. In other words, the lengths of the bars from the line N are representative of the durations for which the third, fourth, fifth and sixth switch means $S_3$, $S_4$, $S_5$ and $S_6$ incorporated in the second switch assembly Db remain closed when the transmission gearshift lever 100 is moved from the neutral gear position "N" to the low or reverse-drive gear position "L" or "R" in one fore-and-aft direction $B_1$ thereof or to the direct-drive or overdrive gear position "D" or "OD" in the other lateral direction $B_2$ thereof. The central angles indicated by W are the angles of rotation of the rotatable contact support member 250 which is turned about the center axis of the shaft 246 from the previously mentioned fiducial angular position thereof to an angular position achieved when the first or second synchronizer 80 or 82 is slid on the transmission mainshaft 52 by the striking rod 92 and is fully meshed with any of the gears 56, 58, 60 and 62 (FIG. 1A). On the other hand, the central angles indicated by X are angles of rotation of the rotatable contact support member 250 which is turned about the center axis of the shaft 246 from the fiducial angular position thereof to an angular position having the first or second synchronizer 80 or 82 moved into a position initially producing a fully synchronized condition between the transmission mainshaft 52 and any of the gears 56, 58, 60 and 62 engaged by the synchronizer 80 or 82. The central angle indicated by Y is slightly larger than the central angle X but smaller than the central angle W, while the central angle indicated by Z is far smaller than the central angle X. The arcuate contact elements 280a and 282a forming part of the third switch means $S_3$ are so arranged as to have about the center axis of the shaft 246 a central angle W from their fiducial points in the direction of rotation of the rotatable contact support member 250 turned from its fiducial angular position about the center axis of the shaft 246 when the striking rod 92 is rotated in the direction of the arrowhead $b_1$ about its center axis and a central angle Y from their fiducial points in the direction of rotation of the rotatable contact support member 250 turned from its difucial angular position about the center axis of the shaft 246 when the striking rod 92 is rotated in the direction of the arrowhead $b_2$ about its center axis. Thus, the third switch means $S_3$ is adapted to be open when the transmission gearshift lever 100 moved from the neutral gear position "N" toward the low or reverse-drive gear position "L" or "R" reaches the particular gear position "L" or "R" having the first or second synchronizer 80 or 82 fully meshed with the mainshaft low or reverse-drive gear 58 or 62 in the transmission gear mechanism 12 or when the transmission gearshift lever 100 moved from the neutral gear position "N" toward the direct-drive or overdrive gear position "D" or "OD" reaches a position having the first or second synchronizer 80 or 82 moved past the position initially producing a fully synchronized condition between the transmission mainshaft 52 and the transmission main drive gear 56 or the mainshaft overdrive gear 60 but not yet fully meshed with the gear 56 or 60. The arcuate contact elements 280b and 282b constituting the fourth switch means $S_4$ are arranged in such a manner as to have central angles Y and W from their fiducial points in the directions of rotation of the rotatable contact support member 250 turned from its fiducial angular position about the center axis of the shaft 246 when the striking rod 92 is rotated about its center axis in the directions of the arrowheads $b_1$ and $b_2$, respectively. The fourth switch means $S_4$ is thus adapted to be open when the transmission gearshift lever 100 moved from the neutral gear position "N" toward the low or reverse-drive gear position "L" or "R" reaches a position having the first or second synchronizer 80 or 82 moved beyond the position initially producing a fully synchronized condition between the transmission mainshaft 52 and the mainshaft low or reverse-drive gear 58 or 62 but not yet fully meshed with the gear 58 or 62 or when the transmission gearshift lever 100 is moved from the neutral gear position "N" toward the direct-drive or overdrive gear position "D" or "OD" and reaches the particular gear position "D" or "OD" having the first or second synchronizer 80 or 82 fully meshed with the transmission main gear drive 56 or the mainshaft overdrive gear 60. The arcuate content elements 280c and 282c constituting the fifth switch means $S_5$ are arranged to have a central angle X from their fiducial points in each of the directions of rotation of the rotatable contact support member 250 turned from its fiducial angular position about the center axis of the shaft 246 when the striking rod 92 is rotated about its center axis in each of the directions $b_1$ and $b_2$. The fifth switch means $S_4$ is thus adapted to be open when the transmission gearshift lever 100 moved from the neutral gear position "N" toward any of the low, direct-drive, overdrive or reverse-drive gear position "L", "D", "OD" or "R" reaches a position having the first or second synchronizer 80 or 82 moved into the position initially procuding a fully synchronized condition between the transmission mainshaft 52 and any of the gears 56, 58, 60 or 62 in the transmission gear mechanism 12. The arcuate contact elements 280d and 282d constituting the sixth switch means $S_6$ are arranged to have a central angle Z from their fiducial points in each of the directions of rotation of the rotatable contact support member 250 turned from its fiducial angular position about the center axis of the shaft 246 when the striking rod 92 is turned in each of the directions of arrowheads $b_1$ and $b_2$. The sixth switch means $S_6$ is thus permitted to remain closed when the transmission gearshift lever 100 is held in or slightly moved from the neutral gear position "N".

FIG. 8 shows an electric circuit incorporating the first to sixth switch means $S_1$ to $S_6$ thus constructed and according in conjunction with the manually operated transmission gearshift lever 100. The first and second switch means $S_1$ and $S_2$ arranged within the knob 102 on the manually operated transmission gearshift lever 100 are connected in series with the above described third and fourth switch means $S_3$ and $S_4$, respectively. The series combination of the first and third switch means $S_1$ and $S_3$ and the series combination of the second and fourth switch means $S_2$ and $S_4$ are connected in parallel with the fifth switch means $S_5$ to the positive terminal of a d.c. power source 300 through the solenoid coil (not shown) of the previously described solenoid operated valve actuator 222 and preferably across a third switch assembly 302 which may be constituted by the ignition switch of the engine. If desired, a fuse 304 may be connected between the valve actuator 222 and the third switch assembly 302 as shown. The third switch assembly 302 consists of a first switch element 302a connected between the valve actuator 222 and the power source 300 and a second switch element 302b which is connected between the power source 300 and the coil (not shown) of a cranking motor 306 for the engine. The switch assembly 302 is adapted to close its first and second switch elements 302a and 302b sequentially in response to first and second closing actions, respectively, to be exerted on the switch assembly 302.

Operation of the switch apparatus thus constructed and arranged in accordance with the present invention will be hereinafter described with reference in FIGS. 1A to 8.

When the manually operated gearshift lever 100 is held in the neutral gear position "N", all of the third to sixth switch means $S_3$ to $S_6$ are kept closed as will be understood from the schedules illustrated in FIG. 7. If, therefore, a first closing action is exerted on the third switch assembly 302, the first switch element 302a of the assembly 302 is closed. The fifth switch means $S_5$ being kept closed, the solenoid coil of the valve actuator 222 is energized from the power source 300 through the fifth switch means $S_5$ and the first switch element 302a of the third switch assembly 302 even though the first and second switch means $S_1$ and $S_2$ on the knob 102 of the transmission gearshift lever 100 may be kept or, in other words, the transmission gearshift lever 100 may be kept released. The solenoid operated valve actuator 222 being thus energized from the power source 300, the nozzle 218a in the plug member 218 in the clutch control valve unit 158 is closed by the plunger 222a of the valve actuator 222 with the result that the valve spool 200 of the clutch control valve unit 158 is moved into the second axial position thereof as indicated by the lower half of the valve spool 200 in FIG. 2, thereby causing a fluid pressure to be developed in the second fluid passageway 142 between the transmission input shaft 16 and the stator support hollow shaft 42 of the torque conveter and clutch assembly 10. With a fluid pressure thus developed in the second variable-volume chamber 40 within the clutch housing 36, the clutch piston 46 is moved toward the rear face of the torque converter torus cover 34 and as a consequence the clutch unit 26 is caused to uncouple. When a second closing action is exerted on the switch assembly 302 shown in FIG. 8, the second switch element 302b is closed and enables the cranking motor 306 for the engine to be energized from the power source 300 through the second switch element 302b of the switch assembly 302 and the sixth switch means $S_6$ which is closed with the transmission gearshift lever 100 held in the neutral gear position "N". The engine being thus started, however, the driving torque is not transmitted to the transmission input shaft 16 because the clutch unit 26 is maintained in the uncoupled condition.

When, under these conditions, the transmission gearshift lever 100 is manually moved in one fore-and-aft direction $B_1$ from the neutral gear position "N" toward the low or reverse-drive gear position "L" or "R", the rotatable contact support member 250 of the second switch assembly Sb shown in FIGS. 4 and 5 is driven by the striking rod 92 to turn in one direction from the previously mentioned fiducial angular position thereof about the center axis of the shaft 246. At an instant the rotatable contact support member 250 reaches the rotational position angularly displaced through the predetermined angle Z from the fiducial angular position thereof, the radial contact element 268d on the contact support member 250 is brought out of contact with the associated arcuate contact elements 280d and 282d on the stationary contact support member 252 so that sixth switch means $S_6$ constituted by the contact elements 268d, 280d and 282d is made open and causes the cranking motor 306 for the engine to be de-energized. As the transmission gearshift lever 100 is further moved toward the low or reverse-drive gear position "L" or "R" and accordingly the rotatable contact support element 250 is further driven for rotation away from the fiducial angular position about the center axis of the shaft 246 and reaches the rotational position angularly displaced through the predetermined angle X from the fiducial angular position, the first or second synchronizer 80 or 82 being driven by the striking rod for mating engagement with the mainshaft low or reverse-drive gear 58 or 60, respectively, reaches the position capable of producing a fully synchronized condition between the transmission mainshaft 52 and the low or reverse-drive gear 58 or 60 (which under these conditions is still maintained at rest with the clutch unit 26 held uncoupled) and at the same time the radial contact element 268c on the rotatable contact support member 250 is brought out of contact with the associated arcuate contact elements 280c and 282c on the stationary contact support member 252. The fifth switch means $S_5$ constituted by the contact elements 268c, 280c and 282c is now opened up. While the transmission gearshift lever 100 is being thus manipulated, the manipulative effort imparted to the knob 102 on the gearshift lever 100 (FIG. 3) in the direction of the arrowhead $B_1$ causes the movable contact element 230' on the knob 102 to be pressed onto the associated stationary contact element 240' within the cavity 224 in the knob 102 so that the second switch means $S_2$ constituted by the movable and stationary contact elements 238' and 240' is kept closed. After the rotatable contact support member 250 is turned through the angle X from the fiducial angular position thereof about the center axis of the shaft 246, therefore, electrical connection between the solenoid operated valve actuator 222 and the power source 300 (FIG. 8) is provided through the series combination of the second switch means $S_2$ and the fourth switch means $S_4$ which is still kept closed for a short period of time after synchronism has been achieved between the transmission mainshaft 52 and the mainshaft low or reverse-drive gear 58 or 62 by means of the first or second synchronizer 80 or 82, respectively. The solenoid operated valve actuator 222 is in this fashion kept energized and accordingly the clutch unit 26 is maintained in the uncoupled condition for a short period of time after rotatable contact support member 250 is moved beyond the rotational position which is angularly displaced through the angle X from the fiducial angular position about the center axis of the shaft 246. When the rotatable contact support member 250 is further turned and reaches the rotational position angularly displaced through the predetermined angle Y from the fiducial angular position thereof about the center axis of the shaft 246, the radial contact element 268b on the rotatable contact support member 250 is brought out of contact with the associated arcuate contact elements 280b and 282b on the stationary contact support member 252. The fourth switch means $S_4$ constituted by the contact elements 268b, 280b and 282b is thus opened up. Under these conditions, the third switch means $S_3$ is still kept closed as will be understood from the schedules shown in 7 but the first switch means $S_1$ mounted on the knob 102 on the transmission gearshift lever 100 is kept open in the ansence of a pressing force imparted to the knob 102 in the direction of the arrowhead $B_2$ (FIG. 3). Both of the series combination of the first and third switch means $S_1$ and $S_3$ and the series combination of the second and fourth switch means $S_2$ and $S_4$ being thus open, the solenoid operated valve actuator 222 is disconnected from the power source 300 and is accordingly energized. The plunger 222a of the valve actuator 222 (FIG. 2) is now allowed to retract from the position closing the nozzle 218a in the plug member 218 of the clutch control valve unit 158 so that the valve spool 200 in the unit 158 is moved into the first axial position thereof, thereby allowing the fluid to be discharged from the second variable-volume chamber 40 within the clutch housing 36 and building up a fluid pressure in the first variable-volume chamber 38 within the torque converter torus cover 38 through the first fluid passageway 140 between the stator support hollow shaft 42 and the transmission pump support sleeve 138. The clutch piston 46 is now moved to press the clutch disc web 116 onto the clutch plates 118 and 118' (FIG. 2) and establishes driving connection from the turbine 30 of the torque converter 24 to the transmission input shaft 16 through the clutch unit 26 thus coupled. By the time the clutch unit 26 is thus coupled, the first or second synchronizer 80 or 82 is in mesh with the mainshaft low or reverse-drive gear 58 or 60, respectively, in the transmission gear mechanism 12. When the transmission gearshift lever 100 is moved into the low or reverse-drive gear position "L" or "R" and accordingly the first or second synchronizer 80 or 82 is fully meshed with the mainshaft low or reverse-drive gear 58 or 60, respectively, the radial contact element 268a on the rotatable contact support member 250 of the second switch assembly Sb is located at the extreme ends of the associated arcuate contact elements 280a and 282a on the stationary contact support member 252 so that the third switch means $S_3$ constituted by the contact elements 268a, 280a and 282a is kept closed.

When the transmission gearshift lever 100 thus held in the low or reverse-drive gear position "L" or "R" is moved back to the neutral gear position "N", the first switch means $S_1$ is closed with the movable contact element 238 pressed onto the stationary contact element 240 by the manipulative force imparted to the knob 102 on the transmission gearshift lever 100 in the direction of the arrowhead $B_2$. The third switch means $S_3$ having been kept closed, the solenoid operated valve actuator 222 is energized from the power source 300 and as a consequence the clutch unit 26 is uncoupled at the instant the first switch means $S_1$ is closed. When the transmission gearshift lever 100 is thereafter released from the manipulative effort, the valve actuator 222 is kept energized and accordingly the clutch unit 26 is maintained in the uncoupled condition by means of the fifth switch means $S_5$ which is kept closed when the transmission gearshift lever 100 is held in or in the vicinity of the neutral gear position "N" as will be seen from FIG. 7.

When the transmission gearshift lever 100 is then moved to select the direct-drive or overdrive gear position "D" or "OD", the knob 102 on the gearshift lever 100 is pressed in the direction of the arrowhead $B_2$, electrical connection is provided between the solenoid-operated valve actuator 222 and the power source 300 not only through the fifth switch means $S_5$ but through the series combination of the first and third switch means $S_1$ and $S_3$ until the rotatable contact support member 250 driven by the striking rod 92 for rotation in the direction of the arrow $b_2$ about the center axis of the shaft 246 is turned through the predetermined angle X from the fiducial angular position thereof and accordingly the first or second synchronizer 80 or 82 reaches the position initially producing a synchronized condition between the transmission mainshaft 52 and the transmission main drive gear 56 or the mainshaft overdrive gear 60, respectively, in the transmission gear mechanism 12. When the rotatable contact support member 250 is further turned about the center axis of the shaft 246, the fifth switch means $S_5$ is opened up so that the solenoid operated valve actuator 222 is kept energized from the power source 300 through the series combination of the first and thrid switch means $S_1$ and $S_3$ until the rotatable contact support member 250 reaches rotational position which is angularly displaced through the predetermined angle Y frm the fiducial angular position thereof. When such a rotational position is reached by the rotatable contact support member 250, the third switch means $S_3$ is made open so that, with the second switch means $S_2$ kept open although the fourth switch means $S_4$ still kept closed, the solenoid operated valve actuator 222 is disconnected from the power source 300 and is accordingly de-energized. The clutch unit 26 is therefore allowed to resume the coupled condition so that the driving torque transmitted from the turbine 30 of the torque converter 24 to the transmission input shaft 16 through the clutch unit 26 is carried over to the transmission input shaft 52 through the transmittion maindrive shaft 56 or the mainshaft overdrive gear 60 with which the transmission mainshaft 52 has been fully synchronized by the action of the first or second synchronizer 80 or 82, respectively. When the transmission gearshift lever 100 reaches the direct-drive or overdrive gear position "D" or "OD", the first or second synchronizer 80 or 82 is fully meshed with the transmission main drive gear 56 or the mainshaft overdrive gear 60.

When the transmission gearshift lever 100 is thereafter moved back from the direct-drive or overdrive gear position "D" or "OD" toward the neutral gear position "N", the knob 102 on the gearshift lever 100 is subjected to a manipulative force in the direction of the arrow $B_1$ and as a consequence the second switch means $S_2$ is caused to close. The fourth switch means $S_4$ having been kept closed, electrical connection is established between the solenoid operated valve actuator 222 and the power source 300 through the series combination of the second and fourth switch means $S_2$ and $S_4$ and as a consequence the clutch unit 26 is caused to uncouple as soon as the knob 102 on the transmission gearshift lever 100 is gripped. When the gearshift lever 100 is thereafter released from the manipulative effort in the direction of the arrowhead $B_1$, the second switch means $S_2$ is opened up but the electrical connection between the solenoid operated valve actuator 222 and the power source 300 is maintained through the fifth switch means $S_5$.

When the transmission gearshift lever 100 is moved in the direction indicated by the arrowhead $B_2$ for shifting to the parking gear position "P", the wedge-shaped axial projection 296 of the end portion 294 of the shaft 246 aligned with the striking rod 92 is located within the laterally enlarged portion 292a of the axial slot 292 in the striking rod 292 as shown by full lines in FIG. 6A. If, therefore, the striking rod 92 is turned in the direction of the arrowhead $b_2$ by the transmission gearshift lever 100 moved from the neutral gear position "N" to the parking gear position "P", the axial projection 296 is disengaged from the striking rod 92 so that the rotation of the sriking rod 92 about the center axis thereof is not transmitted to the shaft 246 of the second switch assembly Sb, which accordingly is maintained in the condition having the rotatable contact support member 250 held in the fiducial angular position thereof as in the case where the transmission gearshift lever 100 is in the neutral gear position "N". When the transmission gearshift lever 100 is held in the parking gear position "P", all of the switch means $S_3$, $S_4$, $S_5$ and $S_6$ are kept closed and, for this reason, the cranking motor 306 can be energized through the sixth switch means $S_6$ simply by closing the second switch element 302b of the third switch assembly 302.

From the foregoing description it will have been appreciated that the electric switch apparatus provided by the present invention has the following major advantages:

(1) The second switch assembly Sb can be easily installed on the transmission casing C in such a manner that the contact elements constituting the third, fourth and fifth switch means $S_3$, $S_4$ and $S_5$ are operable accurately in conjuntion with the various gear positions of the transmission gearshift lever 100. Furthermore, there is no need of adjusting the positional relationship among the switch means $S_3$, $S_4$ and $S_4$ during assemblage of the second switch apparatus Sb.

(2) The switch means $S_6$ for energizing the cranking motor 306 for the engine is permitted to close only when the transmission gearshif lever 100 is in the neutral or parking gear position "N" or "P". Incorporation of such switch means $S_6$ into the engine starting system will provide ease of inspection and servicing of the system because the system need be checked for the particular switch means alone.

(3) The engagement between the striking rod 92 and the shaft 246 of the second switch assembly Sb being such that the rotatable contact support member 250 is enabled to remain in the fiducial angular position thereof when the transmission gearshift lever 100 is not only in the neutral gear position "N" but in the parking gear position "P", the contact elements 268a to 268d on the rotatable contact support member 250 and the contact elements 280a to 280d and 282a to 282d on the stationary contact support member 252 can be arranged in circumferential directions and on fixed planes, thereby providing simplicity of construction.

What is claimed is:

1. In an automotive power train having a power transmission system including a gear mechanism having a plurality of gear positions, a manually operated gearshift lever movable in opposite gear-shifting directions, and a control member having a center axis and operatively connected to the gearshift lever, the control member being movable in opposite directions in response to the movement of the gearshift lever in the gear-shifting directions thereof, an automatically operated clutch unit intervening between said gear mechanism and a driving source, and electrically operated clutch control means for operating said clutch unit in response to a condition in which a shift is being made between the gear positions in the gear mechanism from said gearshift lever, the clutch control means being operative to allow said clutch unit to couple when de-energized and to uncouple when energized, an electric switch apparatus electrically connected between a power source and said clutch control means and comprising a first switch assembly responsive to the movement of said gearshift lever in each of said gear-shifting directions and including a parallel combination of first switch means which is normally open and which is to close in response to the movement of said gearshift lever in one of said gear-shifting directions, and second switch means which is normally open and which is to close in response to the movement of the gear-shift lever in the other of said gear-shifting directions, and a second switch assembly including a movable member movable with said control member, a stationary member positioned adjacent the movable member, a set of curved contact elements which are curved about an axis substantially in line with said center axis of said control member, a set of substantially linear contact elements extending in crossing relationship to said curved contact elements, respectively, one of the two sets of contact elements being mounted on said movable member for constituting movable contacts and the other set of contact elements being mounted on said stationary member for constituting stationary contacts which are to be respectively contacted by said movable contacts, each of the movable contacts and the associated one of the stationary contacts constituting in combination clutch control switch means which is to open and close depending upon the relative position of said movable member to said stationary member.

2. In an automotive power train having;

a power transmission system including a gear mechanism having a plurality of gear positions, a manually operated gearshift lever movable in opposite fore-and-aft directions and opposite lateral directions, and a control member operatively connecting the gear-shift lever to the gear mechanism, the control member being axially movable in response to the movement of the gearshift lever in each of said lateral directions and rotatable about its axis in response to the movement of the gearshift lever in each of said fore-and-aft direction for thereby producing any one of said gear positions in the gear mechanism, an automatically operated clutch unit intervening between said gear mechanism and a driving source, and electrically operated clutch control means for operating said clutch unit in response to a condition in which a shift is being made between the gear positions in the gear mechanism from said gearshift lever, the clutch control means being operative to allow said clutch unit to couple when de-energized and to cause the clutch unit to uncouple when energized, an electric switch apparatus electrically connected between a power source and said clutch control means and comprising:

(1) a first switch assembly responsive to movement of said gearshift lever in each of said lateral directions and including a parallel combination of (1-1) first switch means which is normally open and which is to close in response to the movement of the gearshift lever in one of said lateral directions, and (1-2) second switch means which is normally open and which is to close in response to the movement of the gearshift lever in the other lateral directions thereof, and (2) a second switch assembly responsive to the rotation of said control member about the axis thereof and including (2-1) a rotatable member rotatable with said control member about an axis substantially in line with the axis of rotation of the control member (2-2) a stationary member positioned adjacent the rotatable member, the control member being rotatable relative to the stationary member and axially movable relative to both the stationary member and the rotatable member, (2-3) a set of contact elements extending in radial directions of the rotatable member and spaced apart from each other about the axis of rotation of the rotatable member, (2-4) a set of contact elements extending arcuately about the axis of rotation of the rotatable member and spaced apart from each other in circumferential directions of the rotatable member, one of the two set of contact elements being mounted on said rotatable member for constituting movable contacts and the other set of contact elements being mounted on said stationary member for constituting stationary contacts which are to be respectively contacted by said movable contacts, each of the movable contacts and the associated one of the stationary contacts constituting in combination clutch control switch means which is to open and close depending upon the rotational position of said rotatable member relative to the stationary member, the first and second switch assemblies being electrically connected in series with said clutch control means.

3. An electric switch apparatus as set forth in claim 2, in which said control member has an end portion engageable with said rotatable member and has formed in the end portion an elongated slot extending in parallel with the direction of the axial movement of the control member and having a laterally enlarged end portion open at the end of said end portion, wherein said second switch assembly further includes a shaft supporting and rotatable with said rotatable member and having at one end of the shaft an axial projection protruding into said elongated slot in said control member for providing engagement between said control member and said shaft when said projection is located out of said enlarged portion of said slot, the second switch assembly further comprising biasing means for urging said rotatable member to turn about the axis of rotation thereof toward a predetermined rotational position corresponding to predetermined one of said gear positions and holding said axial projection out of said enlarged portion of said slot.

4. An electric switch apparatus as set forth in claim 2, in which the respective clutch control switch means constituted by the individual combinations of said movable and stationary contacts comprise third switch means to close when said gearshift lever is within a predetermined positional range having one end at the limit of the movement of the gearshift lever in one of said lateral directions and the other end immediately anterior to the limit of the movement of the gearshift lever in the other of said lateral directions, and fourth switch means to close when the gearshift lever is within a predetermined positional range having one end immediately anterior to the limit of the movement of the gearshift lever in said one of the lateral directions thereof and the other end at the limit of the movement of the gearshift lever in said other of the lateral directions thereof, the third and fourth switch means being electrically connected in parallel to said clutch control means across said first and second switch means, respectively.

5. An electric switch apparatus as set forth in claim 4, in which said clutch control switch means further comprise fifth switch means to close when said gearshift lever is within a predetermined positional range having opposite ends immediately anterior to the limits of the movement of the gearshift lever in said lateral directions thereof, the fifth switch means being electrically connected to said clutch control means in parallel with said third and fourth switch means.

* * * * *